(12) United States Patent
de los Reyes et al.

(10) Patent No.: US 8,924,879 B2
(45) Date of Patent: *Dec. 30, 2014

(54) METHOD AND SYSTEM FOR CONTROLLING PHYSICAL COMPONENTS VIA A VIRTUAL ENVIRONMENT

(71) Applicant: AT&T Intellectual Property I, L.P., Atlanta, GA (US)

(72) Inventors: Gustavo de los Reyes, Fair Haven, NJ (US); Sanjay Macwan, Marlboro, NJ (US); Gang Xu, Piscataway, NJ (US); Howard Shirokmann, Point Pleasant, NJ (US); Rachel Rosencrantz, Boulder, CO (US); Thusitha Jayawardena, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,208

(22) Filed: Oct. 22, 2013

(65) Prior Publication Data

US 2014/0052277 A1 Feb. 20, 2014

Related U.S. Application Data

(63) Continuation of application No. 12/341,238, filed on Dec. 22, 2008, now Pat. No. 8,578,287.

(60) Provisional application No. 61/096,960, filed on Sep. 15, 2008.

(51) Int. Cl.
*G06F 3/048* (2013.01)
*G06F 3/038* (2013.01)
*G06F 3/023* (2006.01)
*H04N 21/462* (2011.01)
*H04N 21/436* (2011.01)
*H04N 21/226* (2011.01)
*G05B 15/02* (2006.01)
*H04N 21/482* (2011.01)
*G06F 3/0489* (2013.01)
*H04N 21/6377* (2011.01)

(52) U.S. Cl.
CPC ............... *G05B 15/02* (2013.01); *G06F 3/038* (2013.01); *G06F 3/023* (2013.01); *H04N 21/4622* (2013.01); *H04N 21/43615* (2013.01); *H04N 21/2265* (2013.01); *H04N 21/482* (2013.01); *G06F 3/0489* (2013.01); *H04N 21/6377* (2013.01)
USPC ............................................................. 715/771

(58) Field of Classification Search
CPC ............................ G06F 11/00; G06F 19/3406
USPC ............................................................. 715/771
See application file for complete search history.

(56) References Cited

U.S. PATENT DOCUMENTS 5,542,040 A * 7/1996 Chang et al. ............... 715/776
2003/0140107 A1 * 7/2003 Rezvani et al. ............ 709/208
(Continued)

*Primary Examiner* — Omar Abdul-Ali
(74) *Attorney, Agent, or Firm* — Fay Kaplun & Marcin, LLP

(57) ABSTRACT

A computer readable storage medium storing a set of instructions that are executable by a processor, the set of instructions being operable to store a virtual representation of a plurality of physical components, display the virtual representation, receive user interaction with at least one of the virtual representations and send a command to the physical component corresponding to the user interaction.

20 Claims, 4 Drawing Sheets

(56) References Cited

U.S. PATENT DOCUMENTS

| | | | |
|---|---|---|---|
| 2007/0003224 A1* | 1/2007 | Krikorian et al. | 386/95 |
| 2008/0256485 A1* | 10/2008 | Krikorian | 715/810 |
| 2009/0102983 A1* | 4/2009 | Malone et al. | 348/734 |
| 2009/0157697 A1* | 6/2009 | Conway et al. | 707/10 |

\* cited by examiner

METHOD AND SYSTEM FOR CONTROLLING PHYSICAL COMPONENTS VIA A VIRTUAL ENVIRONMENT

PRIORITY CLAIM/INCORPORATION BY REFERENCE

This application claim priority to U.S. Provisional Patent Application 61/096,960 entitled "Method and System for Controlling Physical Components Via A Virtual Environment" filed on Sep. 15, 2008, which is hereby incorporated, in its entirety into this disclosure.

BACKGROUND

As embedded devices (e.g., any device that includes a processor, controller, micro-controller or other type of computing device) become ubiquitous in a variety of environments such as the home and the workplace, users have a desire for better interaction with such devices.

SUMMARY OF THE INVENTION

A computer readable storage medium storing a set of instructions that are executable by a processor, the set of instructions being operable to store a virtual representation of a plurality of physical components, display the virtual representation, receive user interaction with at least one of the virtual representations and send a command to the physical component corresponding to the user interaction.

A system having a physical environment including at least one component and a virtual environment storing and displaying a virtual representation of the physical environment, receiving user interaction with the virtual representation and sending a command to the component corresponding to the user interaction.

A method for receiving first data corresponding to second data that is being input to a physical component, displaying a virtual representation of the physical component, the display including a display of the first data, receiving user input via the virtual representation and sending a command to the physical component corresponding to the user input.

DETAILED DESCRIPTION

Figure 1:
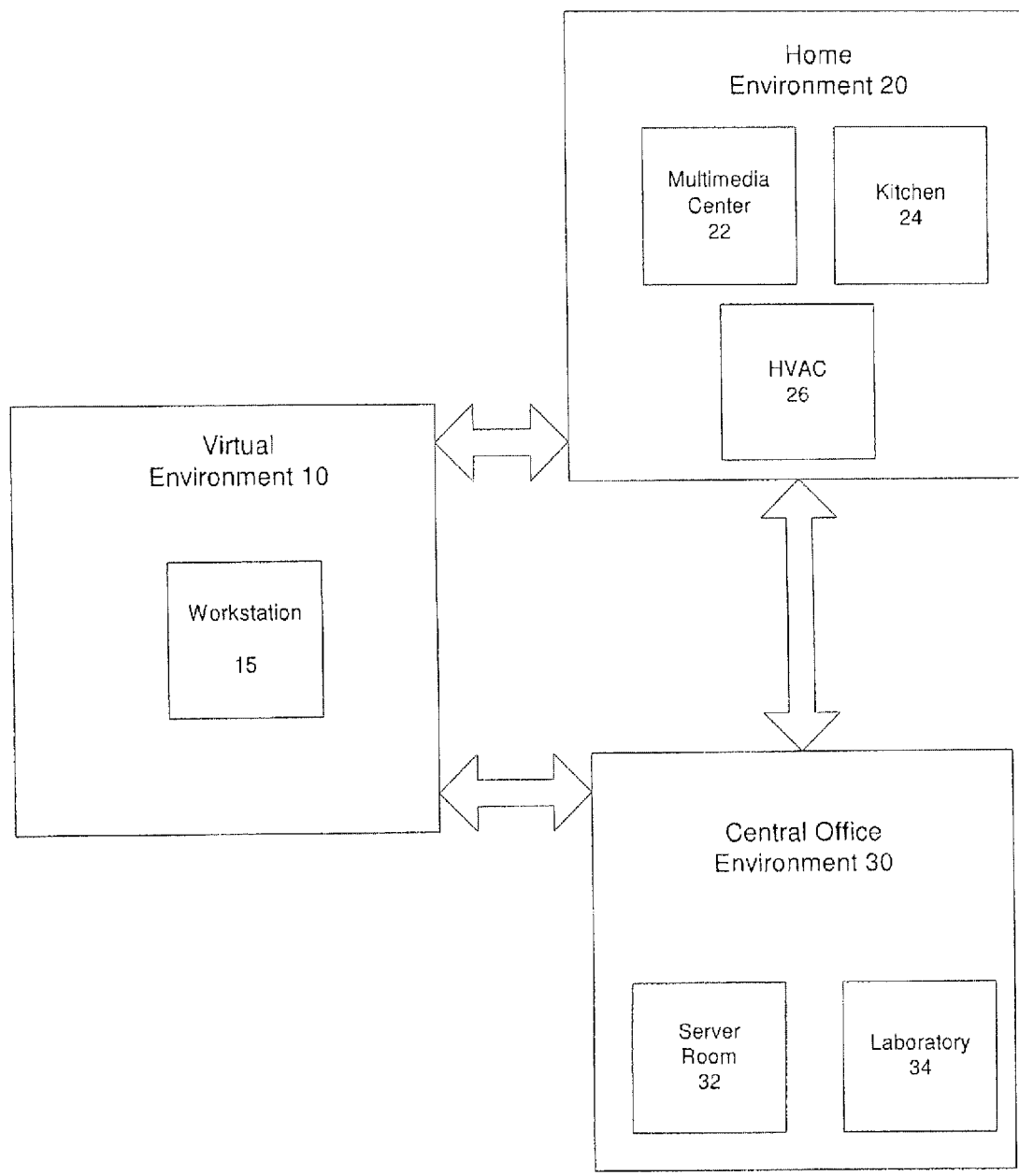
FIG. 1 shows a schematic representation of various environments according to an exemplary embodiment of the present invention.

The exemplary embodiments of the present invention may be further understood with reference to the following description and the related appended drawings, wherein like elements are provided with the same reference numerals. The exemplary embodiments of the present invention are related to systems and methods for controlling and/or interacting with physical devices and/or applications via a virtual interface. The exemplary embodiments will be described with reference to a server network providing multimedia capabilities to a home environment. However, those skilled in the art will understand from the following description that the present invention is applicable to any situation where physical devices or applications may be modeled virtually for the purpose of controlling or interacting with the physical device or application.

FIG. 1 shows a schematic representation of various environments. The environments include a home environment 20 that includes a multimedia center 22, a kitchen 24 and an HVAC system 26. In this example, the home environment is discretely broken up into physical locations (e.g., multimedia center 22 and kitchen 24) or physical function (e.g., HVAC system 26) where controllable components exist. A more detailed view of the multimedia center will be provided below. However, it should be noted that the present invention is not limited to multimedia components, but may be implemented to control any physical device that is capable of being controlled (e.g., a thermostat, an oven, etc.).

Another exemplary embodiment of an environment is a central office environment 30 of a company that is distributing multimedia signals to the home environment 20. The central office environment 30 includes a server room 32 and a laboratory 34. In addition, a virtual environment 10 is also illustrated. The virtual environment is illustrated as including a workstation 15. Those of skill in the art will understand that a more proper understanding of the interaction between the virtual environment 10 and the workstation 15 is that the virtual environment 10 is being executed by the workstation 15. That is, the workstation 15 may be any computing device that is capable of executing the software necessary for carrying out the functionality described herein for the virtual environment 10. For example, the computing device may be a desktop computer, server station, laptop computer, mobile computing device such as a mobile phone, etc.

As shown in FIG. 1, the central office environment 30 and the home environment 20 may exchange signals. An example of the signals may be a request from the multimedia center 22 for a particular video file (e.g., a movie) from the central office environment 30. The server room 32 of the central office environment 30 may receive the request and fulfill the request by sending the requested video signal to the multimedia center 22. In addition, in this example, it is shown that there is an interaction between the virtual environment 10 and both the home environment 20 and the central office environment 30. As will be described in greater detail below, this interaction allows a user working in the virtual environment 10 to exercise control over physical components included in the home environment 20 and/or the central office environment 30 using the interface provided by the virtual environment 10.

Figure 2:
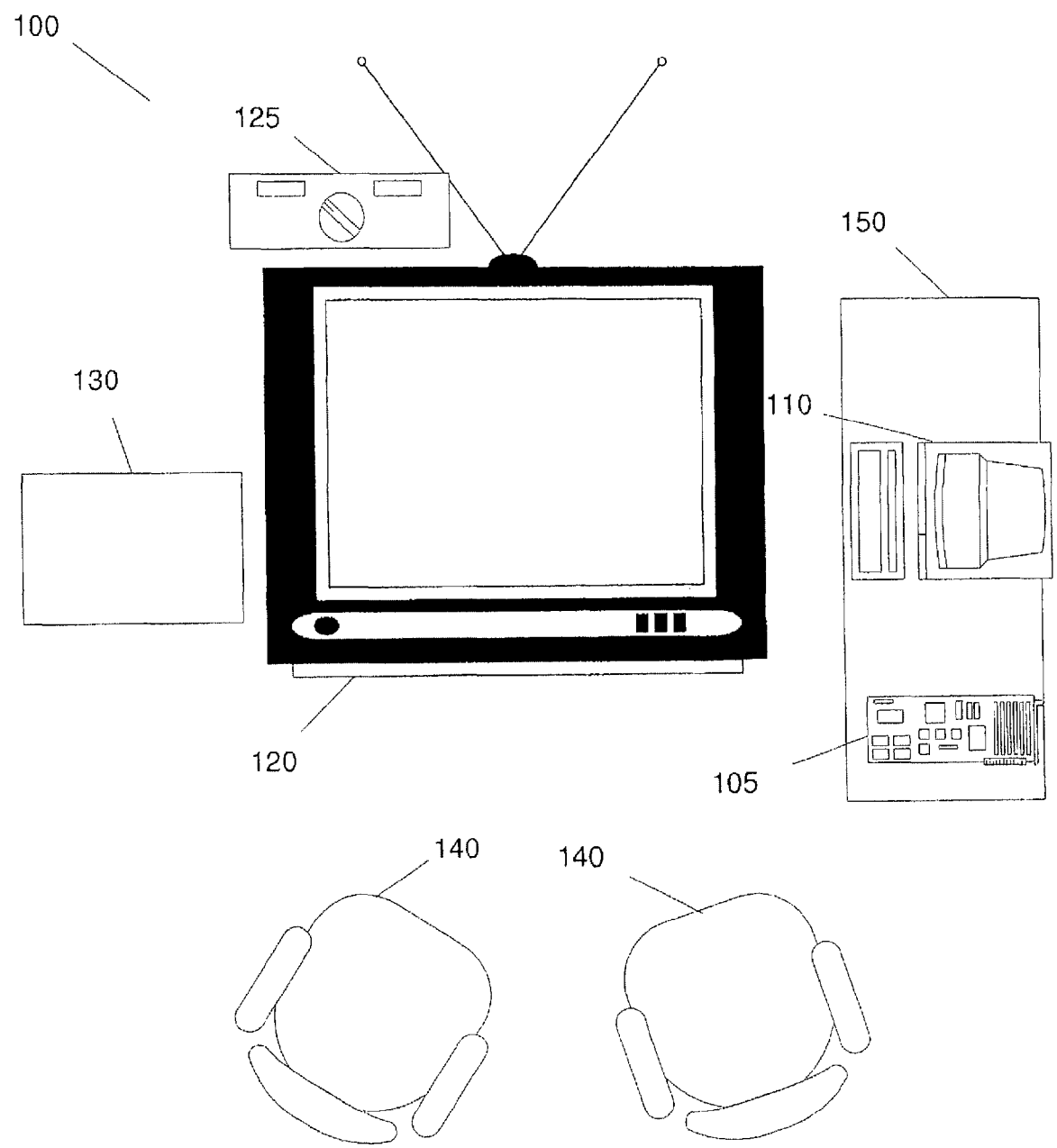
FIG. 2 shows a virtual physical view of a multimedia center of a home environment according to an exemplary embodiment of the present invention.

FIG. 2 shows a virtual physical view 100 of the multimedia center 22 of the home environment 20. The virtual physical view 100 is created in either the virtual environment 10 or in some other computing device executing a commercially available simulation or virtual world software program to model the actual multimedia center 22 of the home environment and then loaded or stored in the virtual environment 10. The virtual physical view 100 includes multimedia components such as a residential gateway 105, a computer 110, a television 120, a set top box 125 and a stereo 130. The virtual physical view 100 also includes physical entities such as chairs 140 and desk 150 to model the actual physical environment of the multimedia center 22. The physical view 100 may be a replica of the multimedia center 22 (e.g., the physical floor plan shown in the virtual physical view 100 is nearly exactly the same as the actual floor plan of the multimedia center 22) or it may be an abstract representation of the multimedia center 22 (e.g., the multimedia components may be displayed, but not in their exact locations or layouts). The user may select and build the type of physical view with which they are comfortable.

Figure 3:
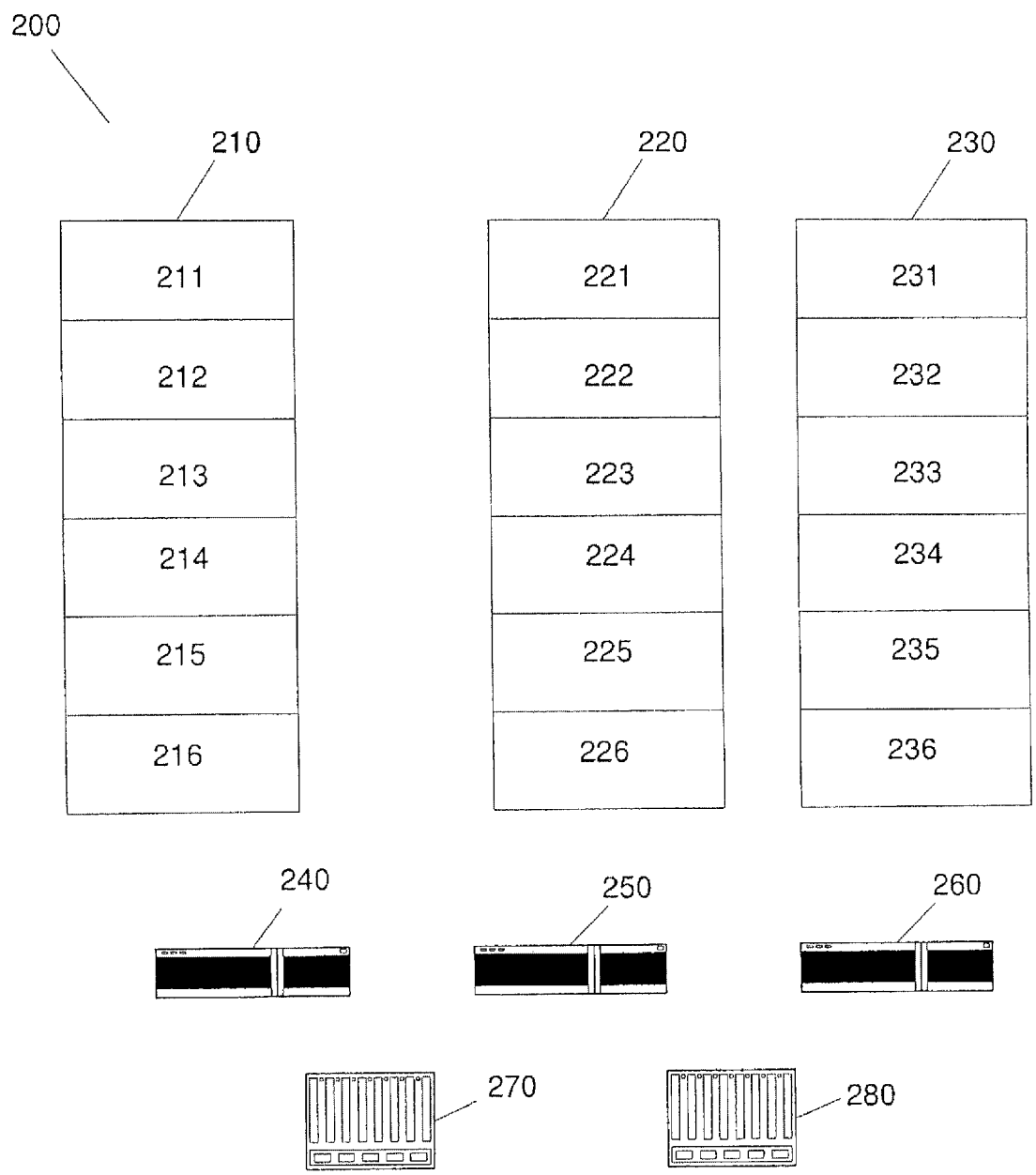
FIG. 3 shows a virtual physical view of a server room of a central office environment for generating and distributing the multimedia information destined for the multimedia center according to an exemplary embodiment of the present invention.

FIG. 3 shows a virtual physical view 200 of a server room 32 of the central office environment 30 for generating and distributing the multimedia information destined for the multimedia center 22. The physical view 200 is similar to physical view 100, except that it shows the other end of the distribution network for the multimedia information. The physical view 200 shows server rack 210 including servers 211-216, server rack 220 including 221-226 and server rack 230 including servers 231-236. The physical view 200 also includes other network components such as routers 240-260 and switches 270 and 280. As will be described in greater detail below, the components in the actual server room 32 are responsible for generating and distributing the multimedia signals that are consumed by the multimedia center of the user's home.

Figure 4:
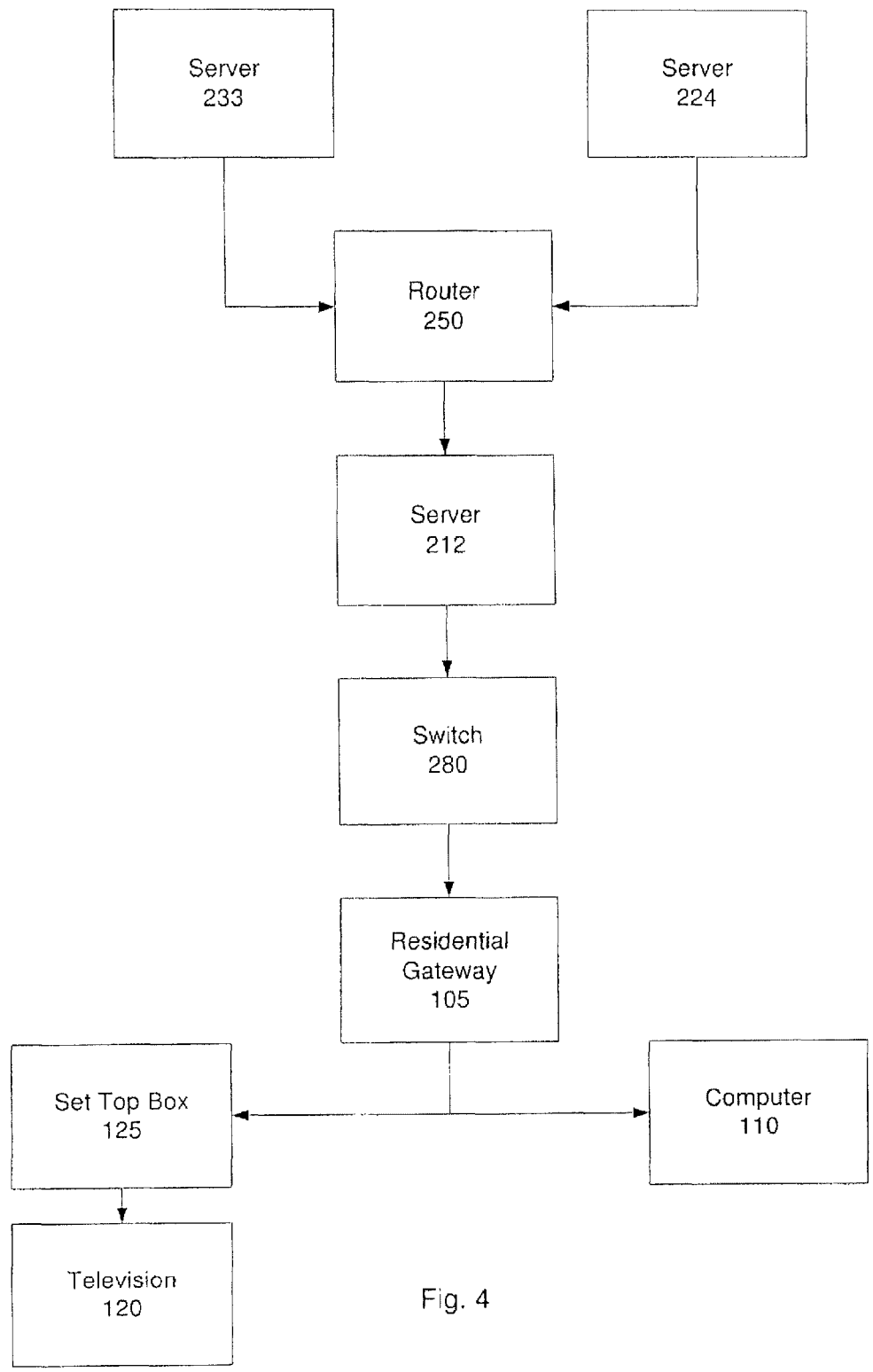
FIG. 4 shows a virtual logical view of a video distribution channel providing video from the central office environment to the multimedia center of the home environment according to an exemplary embodiment of the present invention.

FIG. 4 shows a virtual logical view 300 of a video distribution channel providing video to the multimedia center 22. In this exemplary embodiment, the video distribution channel includes servers 233 and 224 (or applications on the servers 233 and 224) that generate the video to be distributed, router 250 that receives the video signal from servers 233 and 224 and routes it to server 212 that is responsible for distribution of the video signal. The video signal is then sent through switch 280 to residential gateway 105 for distribution to the computer 110 and/or the television 120 via set top box 125. Those skilled in the art will understand that the virtual logical view 300 is only exemplary and that many different logical views may be built to model the distribution of many different types of signals. Thus, there may be many types of logical views that are created and stored in the virtual environment 10. In addition, the logical view 300 may not include all the components in the video distribution channel. For example, between the switch 280 that is in server room 280 and residential gateway 105, there may be other network components such as additional servers, routers, switches, repeaters, etc. Again, the user may build the virtual logical view in any manner that the user is comfortable interacting with the view.

The following will provide an example of the use of the virtual views 100-300 and a user's interaction with the virtual views 100-300. In this example, the user may be considered to be a person associated with the entity that is distributing the multimedia signals who is responsible for security applications. In this example, the user is attempting to run a test that is designed to disrupt the video signal that is being distributed to the multimedia center 22 of the home environment 20. Accordingly, the user may select the video distribution channel virtual logical view 300 from a list of virtual logical views.

Once the logical view 300 for the video distribution channel is selected, the virtual environment 10 will display the virtual logical view 300 to the user. In addition, the one or both of the virtual physical views 100 and 200 may also be displayed. For example, the virtual environment 10 may include multiple displays or multiple display panes to display multiple virtual views. The physical virtual views 100 and 200 may be correlated to the virtual logical view 300. For example, the boxes illustrating the various components of the virtual logical view 300 may be outlined in a specific color. The components illustrated in the virtual physical views 100 and 200 may be colored in the same manner to illustrate the components that are involved in the selected logical view 300. However, it should be noted that two views (e.g., the physical view and the logical view) are not required. For example, a user may be comfortable with only the physical view or the logical view and it may not be necessary to show the other view in the virtual environment 10.

As described above, there is an actual physical connection between the virtual environment 10 (e.g., the workstation 15 executing the virtual environment 10) and the physical components modeled by the virtual views 100-300. Thus, when the user selects the video distribution channel logical view 300, the virtual physical view 100 may show the video signal on the television 120 or computer 110 that is actually being displayed on the television screen or computer screen in the home environment 20.

The components illustrated in the virtual environment 10 may have various functionalities associated with the components that the user may select to perform. The associated functionalities may be selected, for example, using a drop-down menu associated with the component (displayed in either the physical views 100 and 200 or logical view 300). For example, the server 233 may be generating a first video stream and the server 224 may be generating a second video stream. A user, by selecting on of the servers 233 and 224, may be able to toggle the video stream that is being displayed on the television screen 120. As noted above, this control is exerted both in the virtual world (e.g., what is being displayed on the television 120 screen of virtual physical view 100) and on the actual television screen in multimedia center 22.

However, as described above, in this example, the user will be running a test to disrupt the video signal. Thus, the user may select any of the components within the video distribution channel to run an attack to disrupt the video signal. For example, the user may select to run the attack on the residential gateway 105. Thus, the user will select the residential gateway 105 in either the physical view 100 or the logical view 300 and access the attack functionality associated with the residential gateway. As described above, instructions to execute the attack functionality are included in the virtual environment 10. When this functionality is selected, the virtual environment 10 sends a signal to an actual component to run the desired attack on the residential gateway 105. The instructions may be, for example, HTTP commands that are sent to a server or other component such as a testing device to execute the desired attack on the residential gateway 105. The physical component (e.g., server or testing device) then performs the function of attacking the residential gateway 105. If the attack is successful, the video signal will be disrupted at the residential gateway 105 and the television 120 and/or computer 110 will no longer receive the video stream either on the actual components or in the physical virtual view 100. Thus, the user will be able to see if the attack is successful even if the user does not have access to the actual physical component because the virtual component will behave in the same manner as the physical component.

In addition, after the attack has disrupted the video signal, the user may further select additional functionalities associated with the residential gateway 105 to troubleshoot and/or repair the residential gateway 105. In the same manner as described above for the attack, the virtual environment 10 may include instructions for troubleshooting and/or repair that when selected, send instructions from the virtual environment 10 to physical components to perform troubleshooting procedures (e.g., a signal may be sent from the virtual environment directly to the residential gateway 105 to reboot). If the reboot is successful and the video signal is restored, the user will again see in the virtual physical view 100 whether the video signal has been restored to the television 120 and/or computer 110. Thus, as can be seen from this example, the user in the virtual environment 10 can control the operation of physical components in the real world (e.g., the home environment 20 and the central office environment 30). It can also be seen that the user does not need to be resident in either the home environment 20 or the central office environment 30 to control the actual components in these environments.

It should also be noted that in the previous example, it is unlikely that the user associated with the central office environment 30 would have access and virtual views of an actual home environment 20 of a customer, and thus, in the above example, the home environment 20 may be a sample home environment set up in the laboratory 34 of the central office environment for testing purposes. However, there may be multiple employees at the central office environment that are attempting to run tests and/or performing other functions related to either the sample home environment 20 or central office environment 30. Thus, the virtual environment 10 may be a collaborative environment where multiple users can access the functionalities associates with the virtual environment. In such an arrangement, it is possible that the elements of the virtual environment 10 may reside on a central server and that individual users may access the virtual environment 10 via the central server (e.g., web access via a web browser and web server). In such an arrangement, the central server may manage the virtual environment 10 to make sure that conflicting tests are run simultaneously or that more than one user is attempting to access one of the components. This is because, as stated multiple times above, the virtual environment 10 is not simulating the functionality of components via a software simulation, but is sending control commands to actual components. Thus, controlled access by multiple users may be required. However, other schemes of controlled access not using a central server may also be implemented by the exemplary embodiments.

In addition, the virtual physical view 100 may be altered based on the number of users that are accessing the virtual environment 10 at any one time. For example, when a user is accessing the virtual environment 10, that user may be shown in the virtual physical view 100. Thus, other users may know how many and who the other users are.

In a further example, the user may be the owner of the home environment 20 and has access to the virtual physical view 100 of the multimedia center 22. As would be understood, different users may have access to different virtual views and there would be no reason for the homeowner to have access to the virtual physical view 200 of the central office environment 30 or of the video distribution channel logical view 300 because the functionalities that a homeowner have associated with their virtual views will be different from functionalities that other users have. Thus, while it is stated that the physical virtual view 100 is the same for the homeowner and the central office user, the functionalities associated with each of the components within the physical virtual view 100 may, and probably will, be different for different users.

Continuing with the present example, the homeowner user may access the physical virtual view 100 of the multimedia center 22. As described above, the virtual environment 10 may reside on any computing device such as the homeowner's mobile phone, office computer, etc. Thus, the homeowner may access the multimedia center 22 via the physical virtual view 100 when the homeowner is in a remote location. The user may then access one of the physical components via the physical virtual view 100. For example, the homeowner may desire to access the set top box 125 to record a program. By accessing the functionalities associated with the set top box 125 in the physical view 100, the virtual environment may display a further virtual view with which the user may interact.

In a first example, the selection of the record function associated with the physical view 100 of the set top box 125, may send an instruction from the virtual environment 10 to the actual set top box in the multimedia center 22 to begin to display the record menu on the television. This display of the record menu on the television may also be shown on the television 120 of the virtual physical view 100. The user may then interact with the record menu as it is displayed on the television 120 in the virtual physical view 100. As each command is entered by the user, the virtual environment 10 may send the corresponding command to the actual set top box which will operate according to the entered command and modify the display on the actual television (and therefore the virtual television 120). In this manner, the user may interact with the set top box using the virtual environment.

In a second example, the selection of the record function may cause the virtual environment 10 to generate a new physical view that shows the record menu displayed by the set top box 125 in the virtual display. The user may then interact with the various record menu displays shown by the virtual physical view. When the user reaches a logical point in the menu (e.g., when the user has entered all the commands to record a particular program), the virtual environment 10 may send the commands to the actual set top box to perform the record function. The user may receive feedback in the virtual physical view to indicate that the set top box has received and executed the commands.

As described above, the virtual environment 10 may send the commands to the physical components using HTTP commands. However, the present invention is not limited to HTTP commands. That is, the virtual environment 10 may be programmed to send commands in any format or protocol that the physical components can accept. To accomplish getting the commands to the correct physical component, the virtual environment 10 representation of each component may include the unique identity of each physical component (e.g., IP address, MAC address, etc.). The commands issued by the virtual environment 10 may include the unique identifiers to assure that that the commands are routed to the correct physical component.

In the above examples, it was described that the virtual environment 10 may be used to control physical components. However, it also possible to use the virtual environment 10 to monitor the physical environments. For example, the virtual physical view of the HVAC system 26 may include a representation of a thermostat with the set temperature, but may also include the actual temperature of the room for the purpose of monitoring the physical environment. Other examples of monitoring may include the display of network statistics for the switches and routers 240-280 in the central office environment 30. Thus, the virtual environment 10 may be used for various interactions with physical components.

From the above description it should be noted that the virtual environment 10 offers an intuitive interface for remotely (or otherwise) accessing physical components within various environments. The virtual environment 10 is intuitive because a user may see a representation of the actual device and there will be no mistake about which device the user is attempting to access. For example, it would be difficult for the user to mistakenly set the oven at 72° F. and the thermostat at 450° F., rather than the intended opposite settings because the user may set the virtual physical view to show the exact location of the thermostat and oven. The user would have to navigate to the locations within the virtual physical view and then interact with the virtual components. Thus, it would very similar to the user actually walking around their house and manipulating the various components in their house.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A computer readable storage device including a set of instructions executable by a processor, the set of instructions, when executed by the processor, causing the processor to perform operations comprising:
generating a virtual representation of a plurality of physical components, the virtual representation including a simulated error in a functioning of one of the physical components represented in the virtual representation;
receiving a user interaction with the virtual representation, the user interaction relating to the simulated error; and
sending a command to the one of the physical components, the command corresponding to the user interaction.

2. The computer readable storage medium of claim 1, wherein the virtual representation comprises a logical view of the plurality of physical components.

3. The computer readable storage medium of claim 1, wherein the virtual representation comprises a physical view of the plurality of physical components.

4. The computer readable storage medium of claim 1, wherein the physical components comprise embedded devices.

5. The computer readable storage medium of claim 1, wherein the virtual representation comprises a physical representation and a logical representation displayed simultaneously.

6. The computer readable storage medium of claim 5, wherein the physical representation and the logical representation are color coded to display corresponding physical components.

7. The computer readable storage medium of claim 1, wherein the command comprises a hypertext transfer protocol command.

8. The computer readable storage medium of claim 1, wherein the command comprises a unique identifier of the one of the physical components.

9. The computer readable storage medium of claim 8, wherein the unique identifier comprises one of an Internet Protocol address and a Media Access Control address.

10. The computer readable storage medium of claim 1, wherein a function is associated with the virtual representation of each of the physical components.

11. The computer readable storage medium of claim 10, wherein the user interaction comprises a selection of the function associated with the virtual representation of the one of the physical components.

12. A method, comprising:
generating a virtual representation of a plurality of physical components, the virtual representation including a simulated error in a functioning of one of the physical components represented in the virtual representation;
receiving a user interaction with the virtual representation, the user interaction relating to the simulated error; and
sending a command to the one of the physical components, the command corresponding to the user interaction.

13. The method of claim 12, wherein the virtual representation comprises one of a logical view of the plurality of physical components and a physical view of the plurality of physical components.

14. The method of claim 12, wherein the physical components comprise embedded devices.

15. The method of claim 12, wherein the command comprises a hypertext transfer protocol command.

16. The method of claim 12, wherein the command comprises a unique identifier of the physical component.

17. The method of claim 16, wherein the unique identifier comprises one of an Internet Protocol address and a Media Access Control address.

18. The method of claim 12, wherein a function is associated with the virtual representation of each of the physical components.

19. The method of claim 18, wherein the user interaction comprises a selection of the function associated with the virtual representation of the physical component.

20. A system, comprising:
a processor; and
a computer readable storage device including a set of instructions executable by the processor, the set of instructions, when executed by the processor, causing the processor to perform operations comprising,
generating a virtual representation of a plurality of physical components, the virtual representation including a simulated error in a functioning of one of the physical components represented in the virtual representation;
receiving a user interaction with the virtual representation, the user interaction relating to the simulated error; and
sending a command to the one of the physical components, the command corresponding to the user interaction.

* * * * *